(12) United States Patent
Wang et al.

(10) Patent No.: US 9,547,901 B2
(45) Date of Patent: Jan. 17, 2017

(54) METHOD AND APPARATUS FOR DETECTING POINT OF INTEREST (POI) IN THREE-DIMENSIONAL (3D) POINT CLOUDS

(71) Applicant: Samsung Electronics Co., Ltd., Suwon-Si, Gyeonggi-Do (KR)

(72) Inventors: Shandong Wang, Beijing (CN); Lujin Gong, Beijing (CN); Hui Zhang, Beijing (CN); Hyong Euk Lee, Suwon-si (KR); Seon Min Rhee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 52 days.

(21) Appl. No.: 14/324,450

(22) Filed: Jul. 7, 2014

(65) Prior Publication Data

US 2015/0123969 A1    May 7, 2015

(30) Foreign Application Priority Data

Nov. 5, 2013   (CN) .......................... 2013 1 0541258
Feb. 5, 2014   (KR) ........................ 10-2014-0012990

(51) Int. Cl.
  *G06T 7/00*   (2006.01)
  *G06T 15/08*  (2011.01)
(52) U.S. Cl.
  CPC ............. *G06T 7/0028* (2013.01); *G06T 15/08* (2013.01); *G06T 2200/04* (2013.01); *G06T 2207/10028* (2013.01)
(58) Field of Classification Search
  CPC ............... G06T 7/0028; G06T 2210/56; G06T 2200/04; G06T 15/08
  See application file for complete search history.

(56) References Cited

U.S. PATENT DOCUMENTS

| 2012/0075342 A1* | 3/2012 | Choubassi | G06T 7/0081 345/633 |
| 2012/0099782 A1* | 4/2012 | Rhee | G06K 9/4671 382/154 |
| 2012/0206438 A1* | 8/2012 | Porikli | G06K 9/6214 345/419 |

FOREIGN PATENT DOCUMENTS

| JP | 2011003127 A | 1/2011 |
| KR | 2012-0040924 A | 4/2012 |

OTHER PUBLICATIONS

Steder et al.,"Point Feature Extraction on 3D Range Scans Taking into Account Object Boundaries", In Robotics and automation (icra), 2011 ieee international conference on, pp. 2601-2608. IEEE, 2011.*

(Continued)

*Primary Examiner* — James A Thompson
*Assistant Examiner* — Tapas Mazumder
(74) *Attorney, Agent, or Firm* — Harness, Dickey & Pierce, P.L.C.

(57) ABSTRACT

A method and apparatus for detecting a three-dimensional (3D) point cloud point of interest (POI), the apparatus comprising a 3D point cloud data acquirer to acquire 3D point cloud data, a shape descriptor to generate a shape description vector describing a shape of a surface in which a pixel point of a 3D point cloud and a neighboring point of the pixel point are located, and a POI extractor to extract a POI based on the shape description vector is disclosed.

19 Claims, 11 Drawing Sheets

(56) References Cited

OTHER PUBLICATIONS

B. Steder et al. "Robust Place Recognition for 3D Range Data Based on Point Features" 2010 IEEE International Conference on Robotics and Automation, Anchorage Convention Distrct, May 3-8, 2010, pp. 1400-1405.

J. Stückler et al. "Interest Point Detection in Depth Images Through Scale-Space Surface Analysis" IEEE International Conference on Robotics and Automation (ICRA), Shanghai, China, May 2011.

D. Terzopoulos et al. "Constraints on Deformable Models: Recovering 3D Shape and Nonrigid Motion" Elsevier Science Publishers B.V., Artificial Intelligence 36, (1988), pp. 91-123.

E. Boyer et al. "3D Surface Reconstruction Using Occluding Contours" International Journal of Computer Vision 22, 3 (1997) pp. 219-233.

* cited by examiner

METHOD AND APPARATUS FOR DETECTING POINT OF INTEREST (POI) IN THREE-DIMENSIONAL (3D) POINT CLOUDS

CROSS-REFERENCE TO RELATED APPLICATION

This application claims the priority benefit of Chinese Patent Application No. 201310541258.8, filed on Nov. 5, 2013, in the State Intellectual Property Office of the People's Republic of China, and Korean Patent Application No. 10-2014-0012990, filed on Feb. 5, 2014, in the Korean Intellectual Property Office, the entire contents of which are incorporated herein by reference.

BACKGROUND

1. Field

Example embodiments relate to technology for computer graphics or computer vision.

2. Description of the Related Art

A point cloud is a set of data points in some coordinate system. In a three-dimensional (3D) coordinate system, the data points may be defined by X, Y, and Z coordinates, and may represent an external surface of an object. Point clouds may be collected and processed by a depth camera or a three-dimensional (3D) scanner. In a field of computer vision and smart robotics technology, a point of interest (POI) detection algorithm of a 3D point cloud may be used for surface registration technology or object recognition technology.

POI detection algorithms may be characterized in terms of sparseness, distinctiveness, and repeatability. In detail, a number of POIs may be required to efficiently perform a description matching algorithm, each of the POIs may need to distinctively indicate information on a surface structure thereof, and the POIs may need to be repetitively detected under different data conversion conditions.

SUMMARY

The foregoing and/or other aspects may be achieved by a three-dimensional (3D) point cloud point of interest (POI) detection apparatus.

In one or more example embodiments, the 3D POI detection apparatus may include a processor and a memory. the memory may contain instructions that, when executed by the processor, configure the processor as, a 3D point cloud data acquirer to acquire 3D point cloud data, a shape descriptor to generate a shape description vector describing a shape of a surface in which a pixel point of a 3D point cloud and a neighboring point of the pixel point are located, and a POI extractor to extract a POI based on the shape description vector.

The shape descriptor may include a local reference frame generator to generate a local reference frame with respect to the pixel point of the 3D point cloud, a directed distance distribution map generator to generate a directed distance distribution map from the neighboring point of the pixel point to a tangent plane in which the pixel point is located, and a shape description vector generator to generate a shape description vector by expressing the directed distance distribution map based on a limited dimensional vector.

The POI extractor may include an interest value calculator to calculate an interest value based on the generated shape description vector, an edge point identifier to verify a number of zero components in the shape description vector, and determine whether the pixel point is located within a vicinity of an edge or an edge point, and a POI identifier to identify the POI based on the calculated interest value.

The foregoing and/or other aspects may be achieved by a 3D point cloud POI detection method.

In one or more example embodiments, the 3D POI detection method may include acquiring 3D point cloud data, generating a shape description vector describing a shape of a surface in which a pixel point of a 3D point cloud and a neighboring point of the pixel point are located, and extracting a POI based on the generated shape description vector.

The generating may include generating a local reference frame with respect to the pixel point of the 3D point cloud, generating a directed distance distribution map from the neighboring point of the pixel point to the tangent plane in which the pixel point is located, and generating the shape description vector by expressing the directed distance distribution map based on a limited dimensional vector.

The extracting may include calculating an interest value based on the generated shape description vector, verifying a number of zero components in the shape description vector and determining whether the pixel point is located within a vicinity of an edge or an edge point, and identifying the POI based on the calculated interest value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
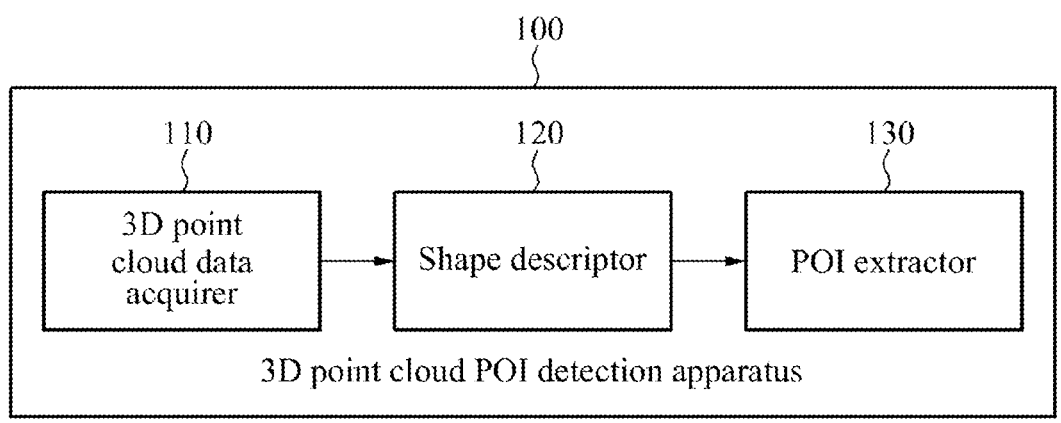
FIG. 1 illustrates a configuration of a three-dimensional (3D) point cloud point of interest (POI) detection apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a configuration of a three-dimensional (3D) point cloud point of interest (POI) detection apparatus according to example embodiments.

Referring to FIG. 1, a 3D point cloud POI detection apparatus 100 may detect a POI from a 3D point cloud as a key point. The 3D point cloud may include a plurality of pixel points with respect to a shape of an object. The pixels points may be classified into an edge point located in an edge area of the object and an internal point located in an area, aside from the edge area.

The 3D point cloud POI detection apparatus 100 may include a 3D point cloud data acquirer 110, a shape descriptor 120, and a POI extractor 130.

The 3D point cloud data acquirer 110 may acquire 3D point cloud data. The 3D point cloud data acquirer 110 may acquire the 3D point cloud data of various formats from various devices. For example, the 3D point cloud data acquirer 110 may acquire a point cloud through a 3D scanner, a depth image through a depth camera, a 3D grid model generated through software, and the like. The 3D point cloud data may include location information on a surface of an object.

In example embodiments, the 3D point cloud data acquirer 110 may include a 3D point cloud preprocessor (not shown). The 3D point cloud preprocessor may preprocess the acquired 3D point cloud data. The 3D point cloud preprocessor may perform a operation of, for example, noise removal, outlier point removal, and downsampling on the 3D point cloud data. For example, the 3D point cloud preprocessor may identify a noise point and a sparse point by analyzing a distribution state of a neighboring point. The 3D point cloud preprocessor may filter noise using, for example, a Gaussian filter. The 3D point cloud preprocessor may remove an outlier point based on a threshold or an existing point cloud division method. The 3D point cloud preprocessor may remove the outlier point based on a statistical analysis of a vicinity of each point. The 3D point cloud preprocessor may fill small holes based on a moving least square scheme. The 3D point cloud preprocessor may perform downsampling on the 3D point cloud data using a 3D filter algorithm to improve a computation speed. When the downsampling is performed, a subsequent operation may be performed based on the downsampled 3D point cloud data. The processes performed in the preprocessing may not be limited by examples described herein, and various processes may be performed in the preprocessing of the 3D point cloud data.

The shape descriptor 120 may generate a shape description vector describing a shape of a surface. The shape description vector may include a pixel point of the 3D point cloud and a neighboring point of the pixel point. The shape descriptor 120 may generate the shape description vector based on distribution information on a directed distance from the neighboring point of the pixel point to a tangent plane in which the pixel point is located.

The shape description vector may reflect a result of local variation of the surface in which the pixel point and the neighboring point are located. The shape description vector may be configured based on a statistical analysis on a directed distance from the tangent plane to each neighboring point.

Since the shape description vector may reflect a protruding variation of a local surface, an increase in a degree of the variation of the surface may increase an interest value, and may also increase a probability that may correspond to the POI. Therefore, the 3D point cloud POI detection apparatus 100 may detect the POI using the shape description vector.

The 3D point cloud POI detection apparatus 100 may determine whether the pixel point is included in the edge point may be determined using the shape description vector. Also, the shape description vector may be set to be a description operator and applied to a feature point matching algorithm.

The POI extractor 130 may extract the POI based on the shape description vector. The POI extractor 130 may calculate an interest value, and identify the POI in the 3D point cloud data based on the calculated interest value.

Through the foregoing process, the 3D point cloud POI detection apparatus 100 may quickly detect the POI from the 3D point cloud data, describe features of the POI, and accurately identify the edge point. Since the 3D point cloud POI detection apparatus 100 statistically analyzes location information on a 3D point, the POI may be detected without a need to compute higher-order differential (HOD) information such as a curvature. Thus, when the 3D point cloud data including noise, missing holes data, or point density variation is to be processed, the 3D point cloud POI detection apparatus 100 may provide a high stability and improve computational efficiency.

Figure 2:
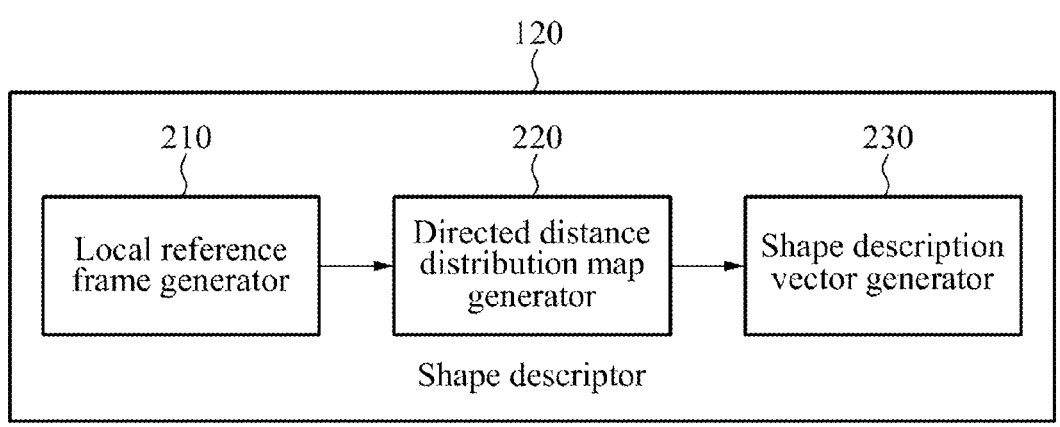
FIG. 2 illustrates a configuration of a shape descriptor according to example embodiments.

FIG. 2 illustrates a configuration of a shape descriptor 120 according to example embodiments.

Referring to FIG. 2, the shape descriptor 120 may include a local reference frame generator 210, a directed distance distribution map generator 220, and a shape description vector generator 230.

The local reference frame generator 210 may generate a local reference frame with respect to a pixel point of a 3D point cloud. The local reference frame may include an X-axis, a Y-axis, and a Z-axis of a coordinate system based on a center of the pixel point.

For example, the local reference frame generator 210 may determine a Z-axial direction of a tangent plane using pixel points located in a small area adjacent to a center point located at a center of a target area. The local reference frame generator 210 may determine an X-axial direction using a neighboring point located within a vicinity of the pixel point.

The local reference frame generator 210 may compute (i) a directed distance from the tangent plane to each of a plurality of neighboring points, (ii) project, onto the tangent plane, a neighboring point corresponding to the largest directed distance, and (iii) determine a direction from the center point toward the projected point, to be the X-axial direction. The local reference frame generator 210 may determine a Y-axial direction based on the determined Z-axial direction and X-axial direction.

Figure 3:
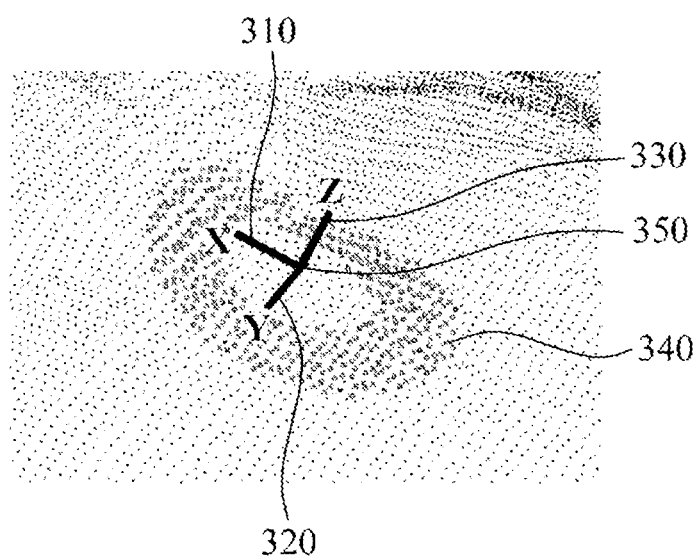
FIG. 3 illustrates an example of a neighboring point and a local reference frame of an internal point according to example embodiments.
Figure 4:
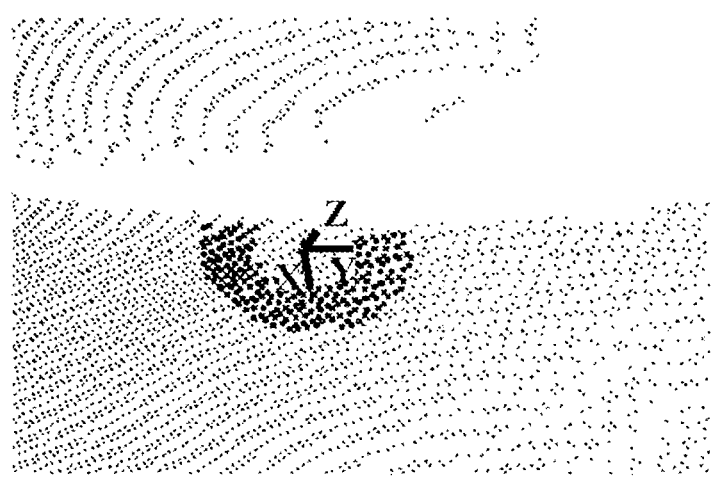
FIG. 4 illustrates a neighboring point and a local reference frame of an edge point according to example embodiments.

FIG. 3 illustrates an example of a neighboring point and a local reference frame of an internal point according to example embodiments. FIG. 4 illustrates a neighboring point and a local reference frame of an edge point according to example embodiments.

Referring to FIGS. 3 and 4, the local reference frame may include an X-axis 310, a Y-axis 320, and a Z-axis 330 based on a center point 350.

The local reference frame may include neighboring point 340. A reference, for example, a radius, for determining a range by which the neighboring point 340 is located around the center point 350 may be designated by a user. For example, the radius may be designated by the user as being from 4 microns (mr) to 10 mr. Based on the center point 350, points located between 4 mr radius and 10 mr radius from the center point 350 may be determined to be the neighboring point 340. An average distance between neighboring points in the 3D point cloud may be referred to as mesh resolution of a 3D point cloud.

Referring back to FIG. 2, the directed distance distribution map generator 220 may generate the directed distance distribution map from the neighboring point of the pixel point to the tangent plane in which the pixel point is located.

The directed distance distribution map may include at least one of information associated with an angle between an X-axial direction and a projection direction from the neighboring point to the tangent plane, and information associated with a directed distance from the tangent plane. For example, each neighboring point may correspond to a mapping relationship as shown in Equation 1.

$$f(\theta)=d \qquad \text{[Equation 1]}$$

In Equation 1, $\theta$ denotes an angle between the X-axial direction and a projection direction from the pixel point to the tangent plane, the angle of a range between $-\pi$ and $+\pi$, and d denotes a directed distance from the pixel point to the tangent plane. The directed distance may have a positive value and a negative value.

Figure 5:
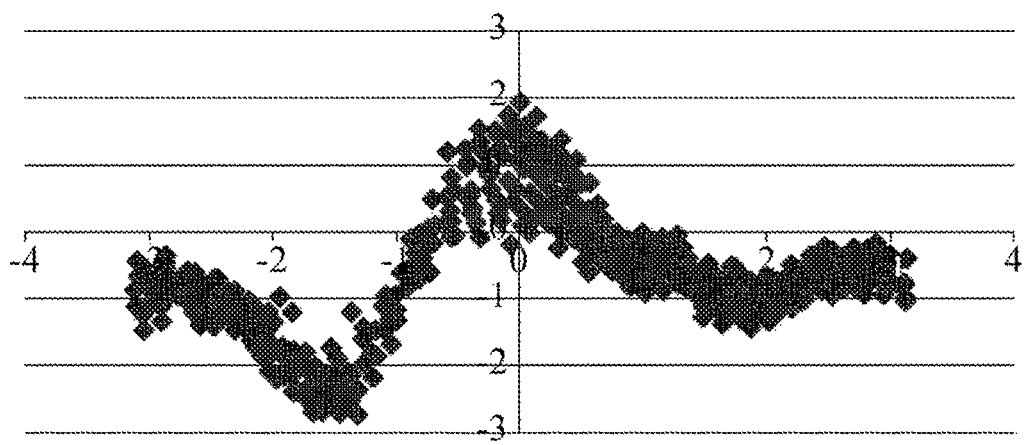
FIG. 5 illustrates an example of a directed distance distribution map of an internal point according to example embodiments.
Figure 6:
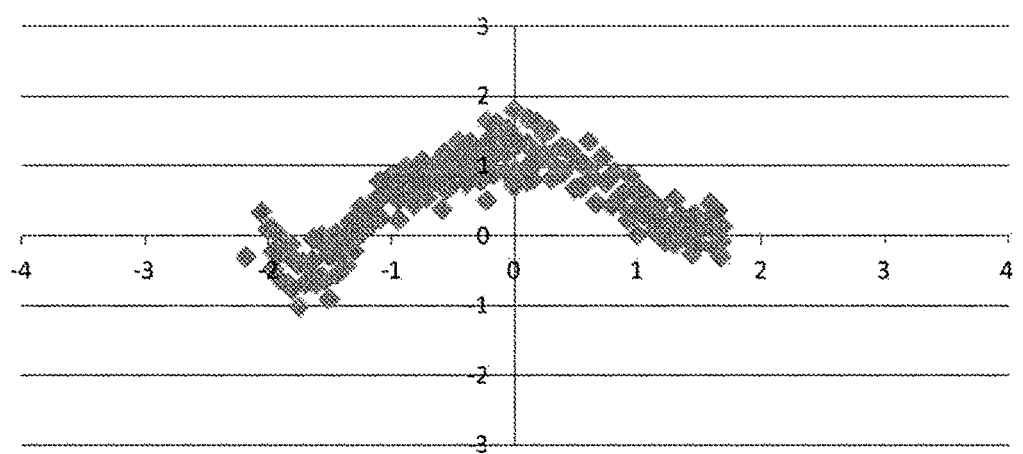
FIG. 6 illustrates an example of a directed distance distribution map of an edge point according to example embodiments.

FIG. 5 illustrates an example of a directed distance distribution map or a distance-angle map of an internal point according to example embodiments. FIG. 6 illustrates an example of a directed distance distribution map of an edge point according to example embodiments.

Referring to FIGS. 5 and 6, in the directed distance distribution map, a horizontal axis may indicate an angle between an X-axial direction and a projection direction to a tangent plane, based on a unit of radians, and a vertical axis may indicate a directed distance from a neighboring point to the tangent plane based on a unit of mr.

Referring back to FIG. 2, the shape description vector generator 230 may generate the shape description vector based on the directed distance distribution map. The shape description vector generator 230 may generate the shape description distribution map by expressing the directed distance distribution map based on a limited dimensional vector. The shape description vector generator 230 may indicate a total variation based on the limited dimensional vector.

The shape description vector generator 230 may divide the directed distance distribution map into N intervals or bins, N being a desired (or, alternatively, a predetermined) natural number, and calculate a sum of a directed distance of the intervals and a number of points in each of the intervals.

Figure 7:
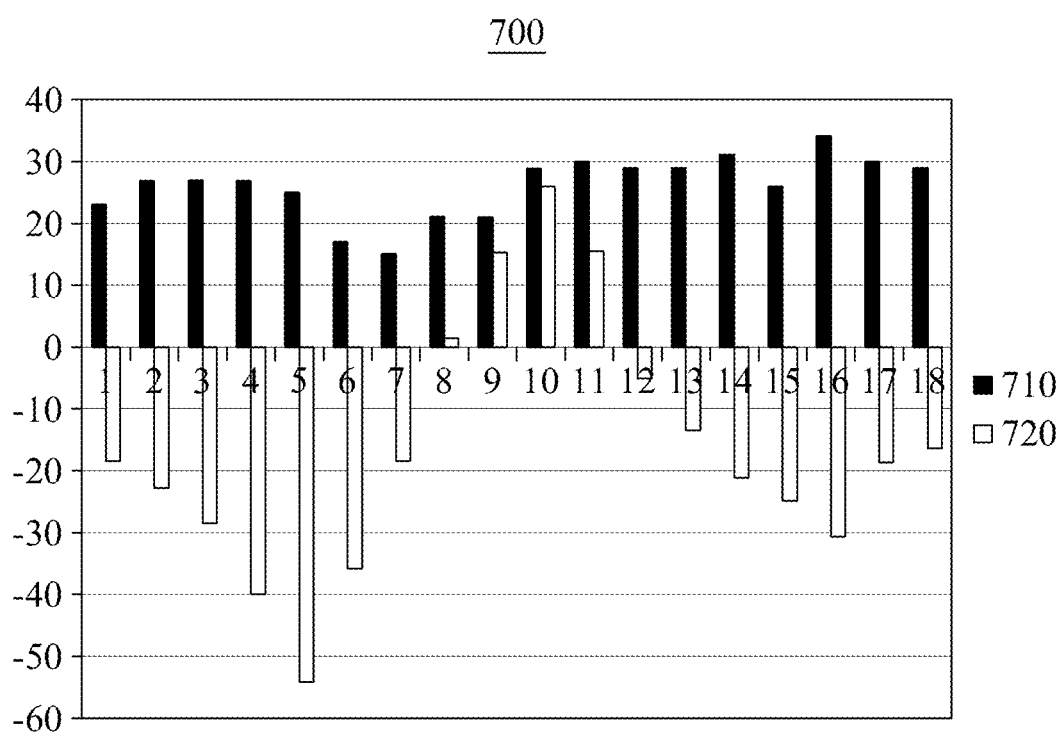
FIG. 7 illustrates an example of a shape description diagram of an internal point according to example embodiments.
Figure 8:
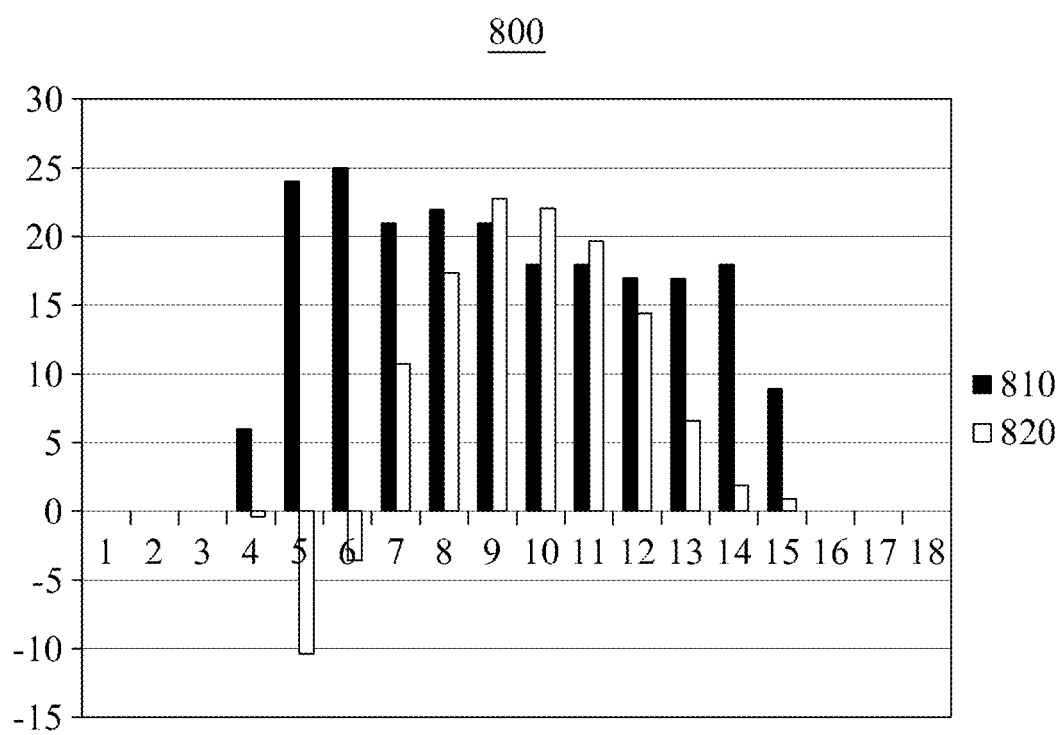
FIG. 8 illustrates an example of a shape description diagram of an edge point according to example embodiments.

FIG. 7 illustrates an example of a shape description diagram of an internal point according to example embodiments. FIG. 8 illustrates an example of a shape description diagram of an edge point according to example embodiments.

Referring to FIGS. 7 and 8, for example, as shown in a shape description diagram 700 of FIG. 7, the shape description vector generator 230 may divide the directed distance distribution map into 18 intervals (N=18), and calculate a number 710 of points in each of the intervals and a sum 720 of a directed distance of the intervals. The shape description vector generator 230 may determine the shape description vector based on the number 710 of points in each of the intervals and the sum 720 of the directed distance of the intervals.

FIG. 7 illustrates an example of a shape description diagram 700 of an internal point, and FIG. 8 illustrates an example of a shape description diagram 800 of an edge point. The shape description diagram 800 of FIG. 8 may indicate a number 810 of points in each interval and a sum 820 of a directed distance of each interval.

Due to clarity of a local reference frame, the shape description vector generator 230 may extend statistical information, for example, a number of points in each interval and a sum of a directed distance of each interval, indicated in the directed distance distribution map to the shape description vector. For example, the number 710 of points of each interval may be defined as vectors $\langle n_1, n_2, \ldots, n_N \rangle$, and the sum 720 of the directed distance of each interval may be defined as vectors $\langle d_1, d_2, \ldots, d_N \rangle$. Here, $n_i$ may indicate a number of points of an $i^{th}$ interval, and $d_i$ may indicate a sum of a directed distance of the $i^{th}$ interval. The shape description vector may be defined as N-dimensional vectors $$\left\langle \frac{d_1}{n_1}, \frac{d_2}{n_2}, \ldots, \frac{d_n}{n_n} \right\rangle.$$

Each component of the shape description vector may indicate an average directed distance corresponding to each interval. Here, in a case of $n_i=0$, a corresponding vector component may be "0", and a final shape description vector obtained by normalizing the shape description vector may be indicated as $\langle D_1, D_2, \ldots, D_N \rangle$.

Figure 9:
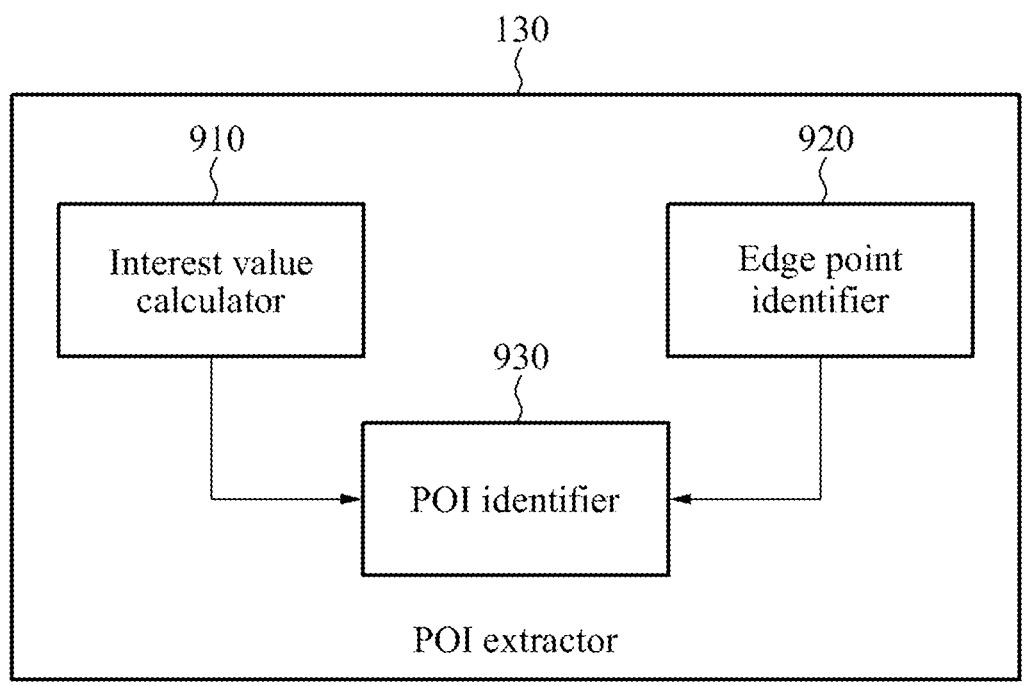
FIG. 9 illustrates a configuration of a point of interest (POI) extractor according to example embodiments.

FIG. 9 illustrates a configuration of a POI extractor according to example embodiments.

Referring to FIG. 9, the POI extractor 130 may include an interest value calculator 910, an edge point identifier 920, and a POI identifier 930. An increase in an interest value may increase a possibility that a shape description vector may correspond to a POI. The POI may be located in an area in which a shape is clearly identified and a degree of local surface variation is relatively large.

The interest value calculator 910 may calculate an interest value based on a shape description vector, for example, N-dimensional shape description vectors $\langle D_1, D_2, \ldots, D_N \rangle$. For example, the interest value calculator 910 may calculate the interest value using three methods based on Equations 2, 3, and 4.

$$I = \mu \cdot \sigma^2 \quad \text{[Equation 2]}$$

In some example embodiments, the interest value calculator 910 may calculate the interest value based on Equation 2, where the interest value is defined as a product of a mean value and a variance of a shape description vector $D_i$. In Equation 2, $\mu$ denotes a mean value of components $D_1, D_2, \ldots, D_N$ of the shape description vector, and $\sigma^2$ denotes a variance of the components $D_1, D_2, \ldots, D_N$ of the shape description vector.

$$I = \max_{i,j}\left( \frac{|D_i - D_j|}{\min(|i-j|, N-|i-j|)} \right) \quad \text{[Equation 3]}$$

In some example embodiments, the interest value calculator 910 may calculate the interest value based on Equation 3, where the interest value is defined as the largest variation rate of a pair of components $\langle D_i, D_j \rangle$ included in the shape description vector. In Equation 3, $D_i$ and $D_j$ denote components of the shape description vector, and N denotes a dimension of the shape description vector.

$$I = \sum_{i=1, j=i+1}^{N} |D_i - D_j| \quad \text{[Equation 4]}$$

In some example embodiments, the interest value calculator 910 may calculate the interest value based on Equation 4, where the interest value is defined as a cumulative value of a difference between neighboring components among the components included in the shape description vector. In Equation 4, $D_i$ and $D_j$ denote components of the shape description vector, and N denotes a dimension of the shape description vector.

The edge point identifier 920 may verify a number of zero components in the shape description vector, and determine whether the pixel point is located within a vicinity of an edge or an edge point. For example, the edge point identifier 920 may verify a number of zero components in an N-dimensional shape description vector, and compare the verified number of zero components to a threshold. When the edge point identifier 920 verifies that the number of zero components is greater than the threshold, the edge point identifier 920 may determine that the pixel point is located within the vicinity of the edge or the edge point. The threshold may be set or changed by a user.

Figure 10:
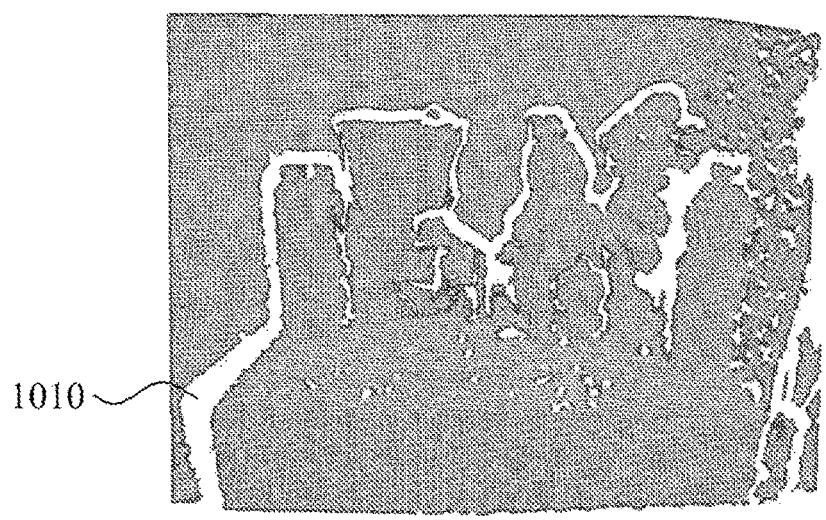
FIG. 10 illustrates an example of a result of edge point detection performed by an edge point identifier according to example embodiments.

FIG. 10 illustrates an example of a result of edge point detection performed by the edge point identifier 920 according to example embodiments.

Referring to FIG. 10, an area 1010 may indicate an area including a vicinity of an edge or an edge point.

Referring back to FIG. 9, the POI identifier 930 may identify the POI based on the interest value calculated by the interest value calculator 910. The POI identifier 930 may determine a point having an interest value that satisfies a desired (or, alternatively, a predetermined) condition within a local neighboring range, to be the POI. For example, the POI identifier 930 may select a point satisfying a reference related to sparseness of the POI, and determine the selected point to be the POI.

The POI identifier 930 may perform a smoothing operation on the interest value calculated by the interest value calculator 910 using a smoothing scheme such as Gaussian smoothing. By performing the smoothing process, a local calculation error occurring due to noise may be prevented.

In this example, the POI identifier 930 may select a point having the largest interest value within a local range using a non-maximum suppression scheme. The POI identifier 930 may control a distance between POIs based on a neighboring radius. The POI identifier 930 may determine a final POI by mapping the point having the largest interest value on the closest pixel point from an initial 3D point cloud.

Whether the point located within the vicinity of the edge or the edge point is set as a candidate POI may be determined based on a necessity of an actual application. When the point located within the vicinity of the edge or the edge point is set to be the candidate POI in data of which internal features are unclearly indicated, the POI may need to be identified and positioned by calculating interest values on all points. Alternatively, the POI may be identified and positioned by calculating the interest value using an existing method.

Figure 11:
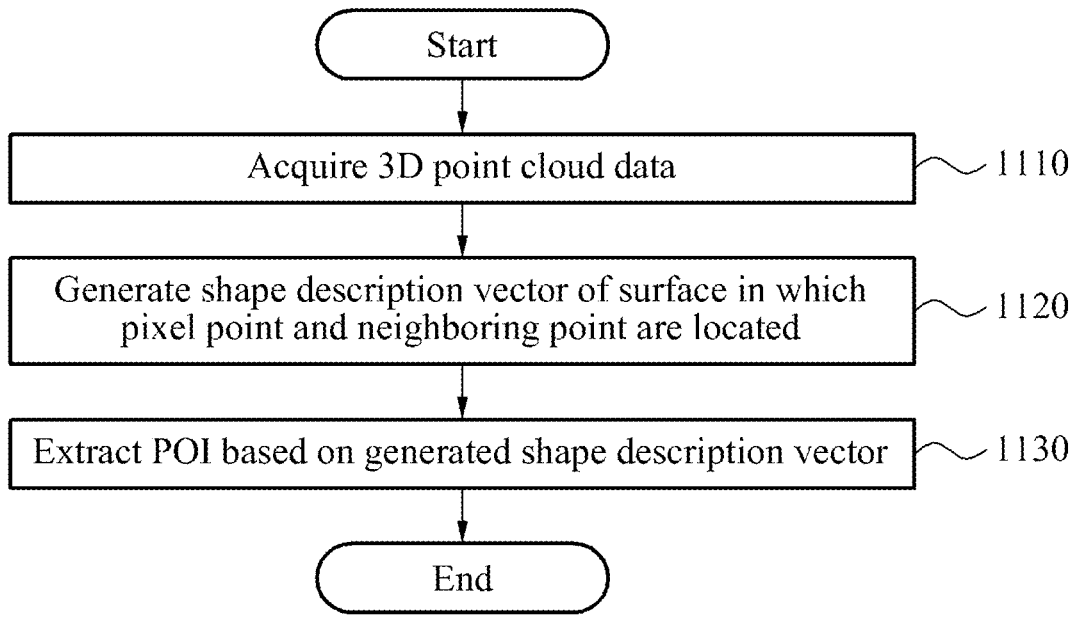
FIG. 11 illustrates a 3D point cloud POI detection method according to example embodiments.

FIG. 11 illustrates a 3D point cloud POI detection method according to example embodiments.

Referring to FIGS. 1 and 11, in operation 1110, the 3D point cloud POI detection apparatus 100 may acquire 3D point cloud data. The 3D point cloud data may be provided in various forms.

Although not shown in FIG. 11, in some example embodiments, the 3D point cloud POI detection apparatus 100 may preprocess the 3D point cloud data. For example, the 3D point cloud POI detection apparatus 100 may perform noise removal, outlier point removal, and downsampling on the 3D point cloud data.

In operation 1120, the 3D point cloud POI detection apparatus 100 may generate a shape description vector describing a shape of a surface in which a pixel point of a 3D point cloud and a neighboring point of the pixel point are located. The 3D point cloud POI detection apparatus 100 may generate the shape description vector based on distribution information associated with a directed distance from the neighboring point of the pixel point to a tangent plane in which the pixel point is located.

In operation 1130, the 3D point cloud POI detection apparatus 100 may extract a POI based on the shape description vector. The 3D point cloud POI detection apparatus 100 may calculate an interest value based on the shape description vector, and identify the POI in the 3D point cloud data based on the calculated interest value.

Figure 12:
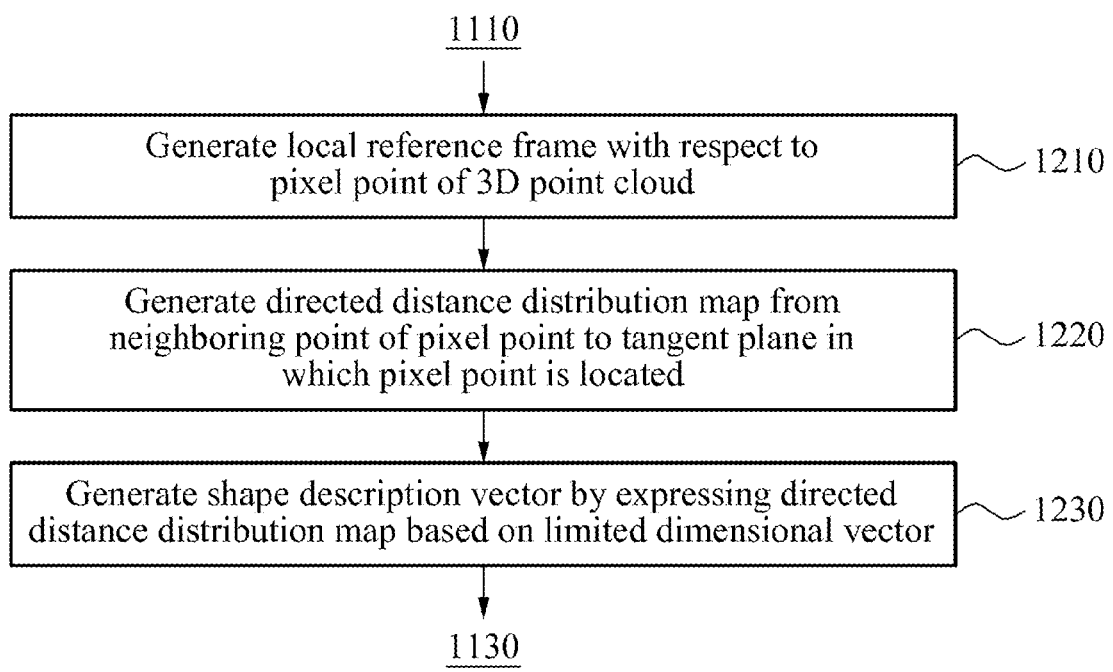
FIG. 12 illustrates a method of generating a shape description vector according to example embodiments.

FIG. 12 illustrates a method of generating a shape description vector according to example embodiments.

Referring to FIGS. 1 and 12, in operation 1210, the 3D point cloud POI detection apparatus 100 may generate a local reference frame with respect to a pixel point of a 3D point cloud. The local reference frame may include an X-axis, a Y-axis, and a Z-axis of a coordinate system based on a center of the pixel point.

In operation 1220, the 3D point cloud POI detection apparatus 100 may generate a directed distance distribution map from a neighboring point of the pixel point to a tangent plane in which the pixel point is located. The directed distance distribution map may include information associated with at least one of an angle between an X-axial direction and a projection direction from the neighboring point to the tangent plane, and a directed distance from the tangent plane.

In operation 1230, the 3D point cloud POI detection apparatus 100 may generate a shape description vector based on the directed distance distribution map. The 3D point cloud POI detection apparatus 100 may generate the shape description vector by expressing the directed distance distribution map based on a limited dimensional vector. The 3D point cloud POI detection apparatus 100 may divide the directed distance distribution map into N intervals, N being a desired (or, alternatively, a predetermined) natural number, and calculate a sum of a directed distance of the intervals and a number of points in each of the intervals. The 3D point cloud POI detection apparatus 100 may determine the shape description vector based on the sum of the directed distance of the intervals and the number of points in each of the intervals.

Figure 13:
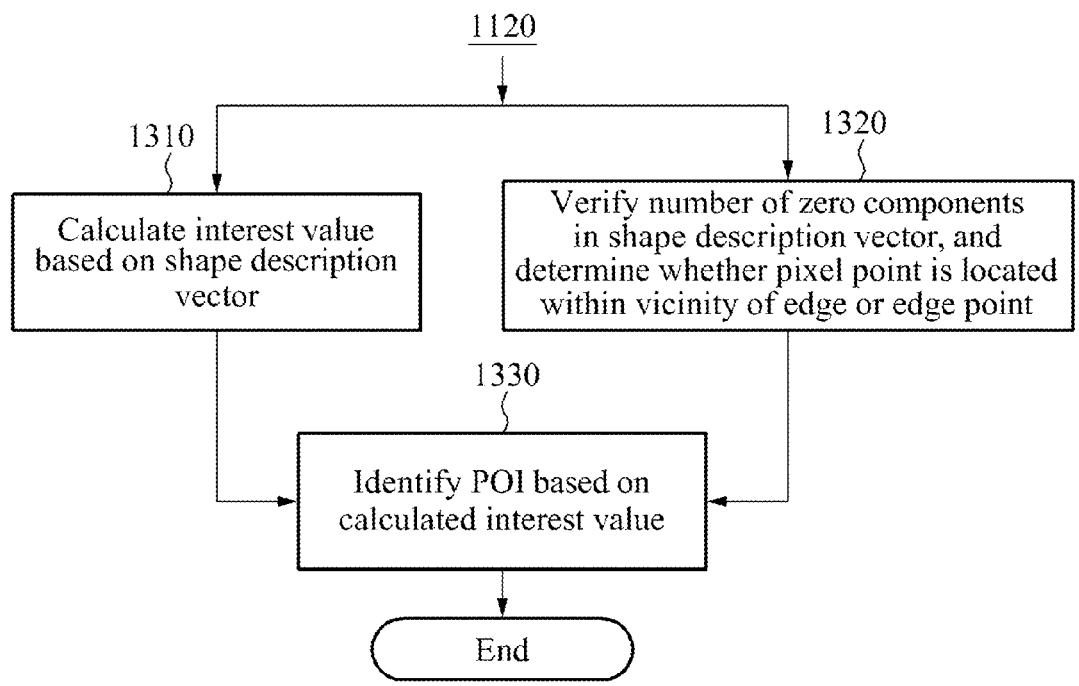
FIG. 13 illustrates a method of extracting a POI according to example embodiments.

FIG. 13 illustrates a method of extracting a POI according to example embodiments.

Referring to FIGS. 1 and 13, in operation 1310, the 3D point cloud POI detection apparatus 100 may calculate an interest value based on a shape description vector. The 3D point cloud POI detection apparatus 100 may calculate the interest value based on one of a product of a variance and a mean value of the shape description vector, the largest variation rate of a pair of components included in the shape description vector, and a cumulative value of a difference between neighboring components among the components included in the shape description vector.

In operation 1320, the 3D point cloud POI detection apparatus 100 may verify a number of zero components in the shape description vector, and determine whether the pixel point is located within a vicinity of an edge or an edge point.

In operation 1330, the 3D point cloud POI detection apparatus 100 may identify the POI based on the calculated interest value. The 3D point cloud POI detection apparatus 100 may determine a point having an interest value that satisfies a desired (or, alternatively, a predetermined) condition within a local neighboring range, to be the POI. For example, the 3D point cloud POI detection apparatus 100 may select a point satisfying a reference related to sparseness of the POI, and determine the selected point to be the POI.

Figure 14:
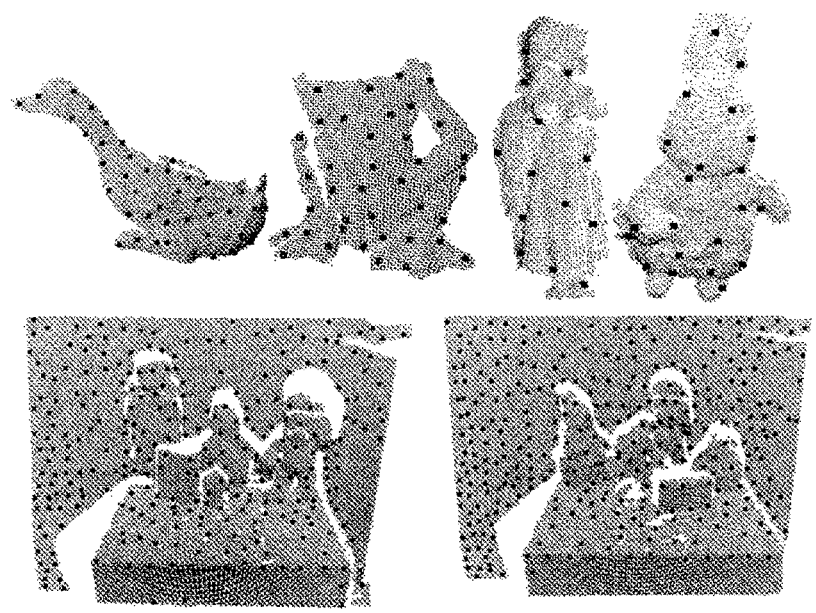
FIG. 14 illustrates an example of a result obtained by detecting a POI in a 3D point cloud according to example embodiments.

FIG. 14 illustrates an example of a result obtained by detecting a POI in a 3D point cloud according to example embodiments.

Referring to FIG. 14, the POI extractor 130 may identify the POI in the 3D point cloud data based on the calculated interest value.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments.

Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

The above-described devices may be implemented using hardware components and software components. For example, the devices included in the 3D point cloud POI detection apparatus 100 may be implemented using hardware components. The hardware components may include a processor and a memory (not shown).

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer configured to perform the methods illustrated in FIGS. 11 to 13.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The memory may be any device capable of storing data including magnetic storage, flash storage, etc. The memory may store, for example, 3d point cloud data.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A three-dimensional (3D) point cloud point of interest (POI) detection apparatus comprising:
    a processor and a memory, the memory containing instructions that, when executed by the processor, configure the processor as,
        a 3D point cloud data acquirer configured to acquire 3D point cloud data,
        a shape descriptor configured to generate a shape description vector, the shape description vector describing a shape of a surface in which a pixel point of a 3D point cloud and a neighboring point of the pixel point are located, and
        a POI extractor configured to,
            determine whether the pixel point is located within a vicinity of an edge or an edge point based on the shape description vector, and
            identify the POI based on an interest value calculated based on whether the pixel point is located within the vicinity of the edge or the edge point and the shape description vector, the interest value representing a degree of variation in the surface.

2. The apparatus of claim 1, wherein the shape descriptor is configured to generate the shape description vector using distribution information, the distribution information associated with a directed distance from the neighboring point to a tangent plane in which the pixel point is located.

3. The apparatus of claim 1, wherein the shape descriptor comprises:
    a local reference frame generator configured to generate a local reference frame with respect to the pixel point of the 3D point cloud;
    a directed distance distribution map generator configured to generate a directed distance distribution map from the neighboring point of the pixel point to a tangent plane in which the pixel point is located; and
    a shape description vector generator configured to generate a shape description vector by expressing the directed distance distribution map based on a limited dimensional vector.

4. The apparatus of claim 3, wherein
    the local reference frame indicates an X-axis, a Y-axis, and a Z-axis of a coordinate system based on a center of the pixel point, and
    the directed distance distribution map includes information associated with at least one of an angle between an X-axial direction and a projection direction from the neighboring point to the tangent plane, and a directed distance from the tangent plane.

5. The apparatus of claim 3, wherein the shape description vector generator is configured to divide the directed distance distribution map into N intervals, N being a natural number, and to determine the shape description vector based on a sum of a directed distance of the intervals and a number of points in each of the intervals.

6. The apparatus of claim 1, wherein the POI extractor comprises:
    an interest value calculator configured to calculate the interest value based on the generated shape description vector;
    an edge point identifier configured to verify a number of zero components in the shape description vector, and to determine whether the pixel point is located within the vicinity of the edge or the edge point based on the number of zero components; and
    a POI identifier configured to identify the POI based on the calculated interest value.

7. The apparatus of claim 6, wherein the interest value calculator is configured to calculate the interest value based on one of a product of a variance and a mean value of the shape description vector, a largest variation rate of a pair of components included in the shape description vector, and a cumulative value of a difference between neighboring components among the components included in the shape description vector.

8. The apparatus of claim 1, wherein the 3D point cloud data acquirer comprises:
    a 3D point cloud data preprocessor configured to preprocess the acquired 3D point cloud data,
        wherein the shape description vector is generated based on the preprocessed 3D point cloud data to the shape descriptor.

9. The apparatus of claim 8, wherein the 3D point cloud data preprocessor is configured to perform at least one of noise removal, outlier point removal, and downsampling on the acquired 3D point cloud data.

10. A three-dimensional (3D) point cloud point of interest (POI) detection method comprising:
    acquiring 3D point cloud data;
    generating a shape description vector, the shape description vector describing a shape of a surface in which a pixel point of a 3D point cloud and a neighboring point of the pixel point are located; and
    identifying a POI by,
        determining whether the pixel point is located within a vicinity of an edge or an edge point based on the shape description vector, and
        identifying the POI based on whether the pixel point is located within the vicinity of the edge or the edge point and an interest value calculated based on the shape description vector, the interest value representing a degree of variation in the surface.

11. The method of claim 10, wherein the generating generates the shape description vector based on distribution information associated with a directed distance from the neighboring point to a tangent plane in which the pixel point is located.

12. The method of claim 10, wherein the generating comprises:
    generating a local reference frame with respect to the pixel point of the 3D point cloud;
    generating a directed distance distribution map from the neighboring point of the pixel point to the tangent plane in which the pixel point is located; and generating the shape description vector by expressing the directed distance distribution map based on a limited dimensional vector.

13. The method of claim 12, wherein
the local reference frame indicates an X-axis, a Y-axis, and a Z-axis of a coordinate system based on a center of the pixel point, and
the directed distance distribution map includes information associated with at least one of an angle between an X-axial direction and a projection direction from the neighboring point to the tangent plane, and a directed distance from the tangent plane.

14. The method of claim 12, wherein the generating of the shape description vector comprises dividing the directed distance distribution map into N intervals, N being a natural number,
calculating a sum of a directed distance of the intervals and a number of points in each of the intervals, and
determining the shape description vector based on the sum of the directed distance of each of the intervals and the number of points in each of the intervals.

15. The method of claim 10, wherein the identifying comprises:
calculating the interest value based on the generated shape description vector;
verifying a number of zero components in the shape description vector;
determining whether the pixel point is located within the vicinity of the edge or the edge point based on the number of zero components; and
identifying the POI based on the calculated interest value.

16. The method of claim 15, wherein the calculating calculates the interest value based on one of a product of a variance and a mean value of the shape description vector, a largest variation rate of a pair of components included in the shape description vector, and a cumulative value of a difference between neighboring components among the components included in the shape description vector.

17. The method of claim 10, wherein the acquiring comprises:
preprocessing the acquired 3D point cloud data, the preprocessing including performing at least one of noise removal, outlier point removal, and downsampling on the acquired 3D point cloud data.

18. A non-transitory computer-readable medium comprising:
a program, that when executed by a processor, configures the processor to perform the method of claim 10.

19. A three-dimensional (3D) point cloud point of interest (POI) detection apparatus comprising:
a processor and a memory, the memory containing instructions that, when executed by the processor, configure the processor to,
acquire 3D point cloud data,
generate a shape description vector, the shape description vector describing a shape of a surface in which a pixel point of a 3D point cloud and a neighboring point of the pixel point are located,
determine whether the pixel point is located within a vicinity of an edge or an edge point based on the shape description vector, and
identify the POI based on whether the pixel point is located within the vicinity of the edge or the edge point and an interest value calculated based on the shape description vector, the interest value representing a degree of variation in the surface.

* * * * *